(12) United States Patent
Kozlowski

(10) Patent No.: US 10,661,688 B2
(45) Date of Patent: May 26, 2020

(54) THERMALLY CONDUCTIVE PADDING

(71) Applicants: Magna Seating Inc, Aurora (CA); Eric Kozlowski, Oakland Township, MI (US)

(72) Inventor: Eric Kozlowski, Oakland Township, MI (US)

(73) Assignee: Magna Seating Inc., Aurora, Ontario (CA)

(*) Notice: Subject to any disclaimer, the term of this patent is extended or adjusted under 35 U.S.C. 154(b) by 224 days.

(21) Appl. No.: 15/766,379

(22) PCT Filed: Oct. 6, 2016

(86) PCT No.: PCT/US2016/055643
§ 371 (c)(1),
(2) Date: Apr. 6, 2018

(87) PCT Pub. No.: WO2017/062547
PCT Pub. Date: Apr. 13, 2017

(65) Prior Publication Data
US 2018/0290574 A1 Oct. 11, 2018

Related U.S. Application Data

(60) Provisional application No. 62/237,824, filed on Oct. 6, 2015.

(51) Int. Cl.
*B60N 2/56* (2006.01)
*B60N 2/58* (2006.01)
*H05B 3/34* (2006.01)

(52) U.S. Cl.
CPC ............ *B60N 2/5678* (2013.01); *B60N 2/56* (2013.01); *B60N 2/5685* (2013.01); *B60N 2/5891* (2013.01); *H05B 3/342* (2013.01); *H05B 2203/029* (2013.01)

(58) Field of Classification Search
CPC ...... B60N 2/5678; B60N 2/56; B60N 2/5685; B60N 2/5891; H05B 3/342; H05B 3/34; H05B 3/28; H05B 3/345; H05B 3/347; H05B 3/0042; H05B 3/18; H05B 3/16; H05B 3/36; H05B 3/40; H05B 3/54; H05B 3/145; H05B 2203/029; H05B 2203/002; H05B 2203/003; H05B 2203/004; H05B 2203/007; H05B 2203/036; H05B 2203/013; H05B 2203/017; H05B 1/0238; H05B 1/0272
See application file for complete search history.

(56) References Cited

FOREIGN PATENT DOCUMENTS

| FR | 2950577 | 4/2011 |
|---|---|---|
| JP | 2011244867 | 12/2011 |
| WO | 2004040943 | 5/2004 |

*Primary Examiner* — Shawntina T Fuqua
(74) *Attorney, Agent, or Firm* — Miller Canfield

(57) ABSTRACT

A thermally conductive padding 20 for transferring heat comprising a layer of cellular foam padding 10 having a plurality of spaced apart openings 22 formed therein. A thermal tunneling pad 24 is seated in each of the openings for creating a thermal path through the thermally conductive padding wherein the thermal tunneling pad includes a cellular foam block 12 encased in strip of thermally conductive graphite ribbon 26.

12 Claims, 6 Drawing Sheets

THERMALLY CONDUCTIVE PADDING

CROSS-REFERENCE TO RELATED APPLICATIONS

This application claims priority to U.S. Provisional Application No. 62/237,824, filed on Oct. 6, 2015.

BACKGROUND OF THE INVENTION

1. Field of the Invention

The present invention relates to a thermally conductive padding with high thermal conductivity for increasing the heat transfer across the padding. More particularly, the invention relates to a thermally conductive padding for increasing the heat transfer, and thus, allowing rapid heating and cooling of the surface of a vehicle seat assembly for seat occupant comfort.

2. Description of Related Art

Automotive vehicles include one or more seat assemblies having a seat cushion and a seat back for supporting a passenger or occupant above a vehicle floor. The seat assembly is commonly mounted to the vehicle floor by a riser assembly. The seat back is typically operatively coupled to the seat cushion by a recliner assembly for providing selective pivotal adjustment of the seat back relative to the seat cushion. Each of the seat cushion and seat back commonly comprise a base foam pad supported by a rigid frame structure and encased in a textile trim cover of cloth, leather, and/or vinyl. The base foam pad provides the firm support and durability to the seat cushion and seat back. A trim padding is also commonly disposed between the base foam pad and the trim cover to provide a softer surface for seat occupant comfort and to improve the appearance of the seat.

It is commonly known to provide seat assemblies with heating and cooling mechanisms for selectively heating and cooling the surface of the seat for seat occupant comfort. These known heating and cooling mechanisms are typically independent mechanisms. For example, it is common to provide an electric wire heating pad between the foam pad and trim cover of the seat cushion or seat back which is electrically actuated by the power from the vehicle battery to electrically charge the heating pad and provide heat to the surface of the seat cushion or seat back. It is also known to provide fans and air ducts to force cool air through the foam pad and trim cover and provide cool air to the surface of the seat cushion or seat back. It is also known to provide fans and ducts to draw warm, moist air away from the seating surface to provide a gradual cooling effect.

However, current heating and cooling mechanisms require a fair amount of time and power to generate sufficient heat or cool air to affect the temperature of the seat assembly and the desired comfort for the seat occupant.

Additionally, the base foam pad and the trim padding are typically composed of cellular polyurethane foam having a very low thermal conductivity, and as such, heat can build up between the seat occupant and padding materials. The base foam pad and trim padding also act as an insulator rather than transferring the heat or cold to the surface of the seat assembly, and thus the power levels of the heating and cooling mechanisms have to be substantial to overcome the insulating properties and effects of the padding.

It is desirable, therefore, to provide thermally conductive padding for transferring and dispersing the heat or cold to and from the surface of the seat assembly.

SUMMARY OF THE INVENTION

According to one embodiment, a thermally conductive padding for transferring heat is provided comprising a layer of cellular foam padding having a plurality of spaced apart openings formed therein. A thermal tunneling pad is seated in each of the openings for creating a thermal path through the thermally conductive padding wherein the thermal tunneling pad includes a cellular foam block encased in strip of thermally conductive graphite ribbon.

According to another embodiment, a thermally conductive padding for transferring heat is provided comprising a layer of trim padding having a top surface and an opposite bottom surface. The trim padding comprises a cellular foam layer and an optional trim layer bonded to the foam layer and forming the top surface. A plurality of slots are formed in the trim padding and extend between said top and bottom surfaces. An elongated strip of thermally conductive graphite ribbon is woven through the slots in the trim padding for creating a thermal path through the thermally conductive padding.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE EMBODIMENTS

Figure 1:
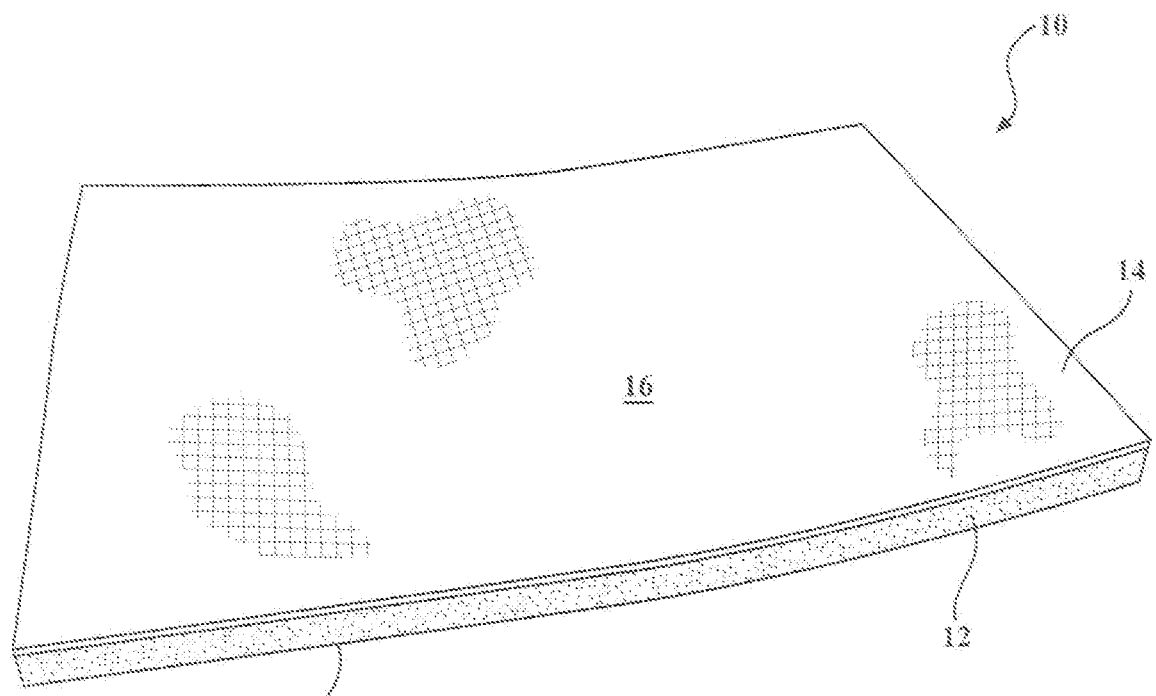
FIG. 1 is a perspective view of trim padding according to the prior art as is commonly used in a seat assembly for an automotive vehicle.
Figure 2:
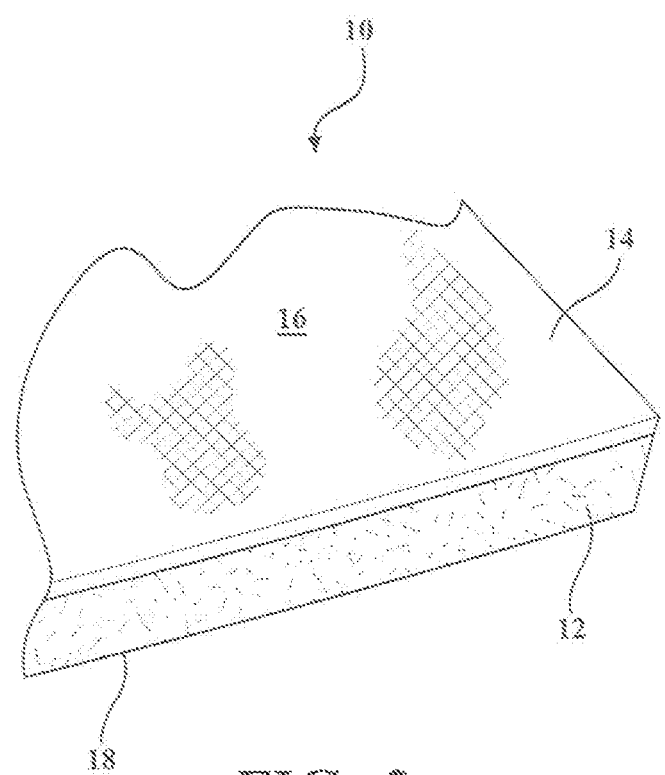
FIG. 2 is an enlarged fragmentary perspective view of the prior art trim padding of FIG. 1.

Referring to the Figures, wherein like numerals indicate like or corresponding parts throughout the several views, a trim padding commonly used in the prior art for automotive seat assemblies, furniture and the bedding industry is shown at 10 in FIGS. 1 and 2. The trim padding 10 comprises a polyurethane cellular foam material 12 which may optionally be topped with a layer of trim material 14, such as nylon cloth, to provide added comfort and durability to the trim padding. The trim padding 10 has a top surface 16 and opposite bottom surface 18.

In the automotive seating industry, as one example of use, a seal assembly generally includes a horizontal seat cushion and a generally upright seat back for supporting a seat occupant within the vehicle as is commonly known in the art. Each of the seat cushion and seat back commonly include a molded resilient cellular foam base pad encased in a trim cover, commonly of cloth, vinyl, or leather. The base pad provides the resilient support to the seat occupant. The trim padding 10 is typically seated between the base pad and the trim cover to provide softer surface comfort to the seat occupant and to improve the appearance of the seat. However, the trim padding 10 currently has a very low thermal conductivity of approximately 0.043 W/m-K, and as such, heat can build up between the seat occupant and the trim padding 10. It is also commonly known to provide a heating or cooling mechanism, such as an electric heating pad, in the seat assembly for providing occupant comfort. However, the trim padding 10 acts as an insulator, and therefore, the desired heating and cooling effects take considerable time to be felt by the occupant. Further, the power levels of the heating and cooling mechanisms have to be substantial to overcome the insulating effects of the trim padding 10.

Figure 3:
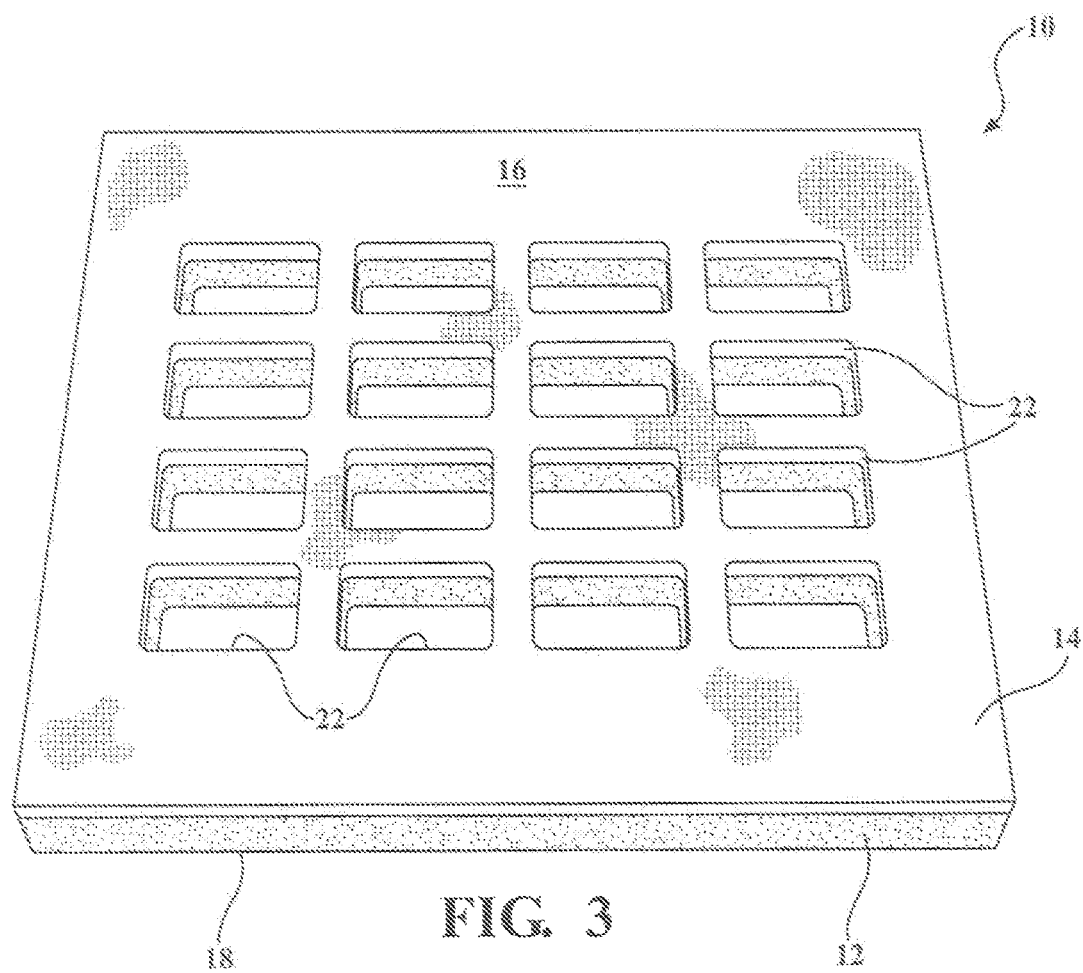
FIG. 3 is perspective view of the trim padding according to one embodiment of the invention with die cut openings formed therein.
Figure 4:
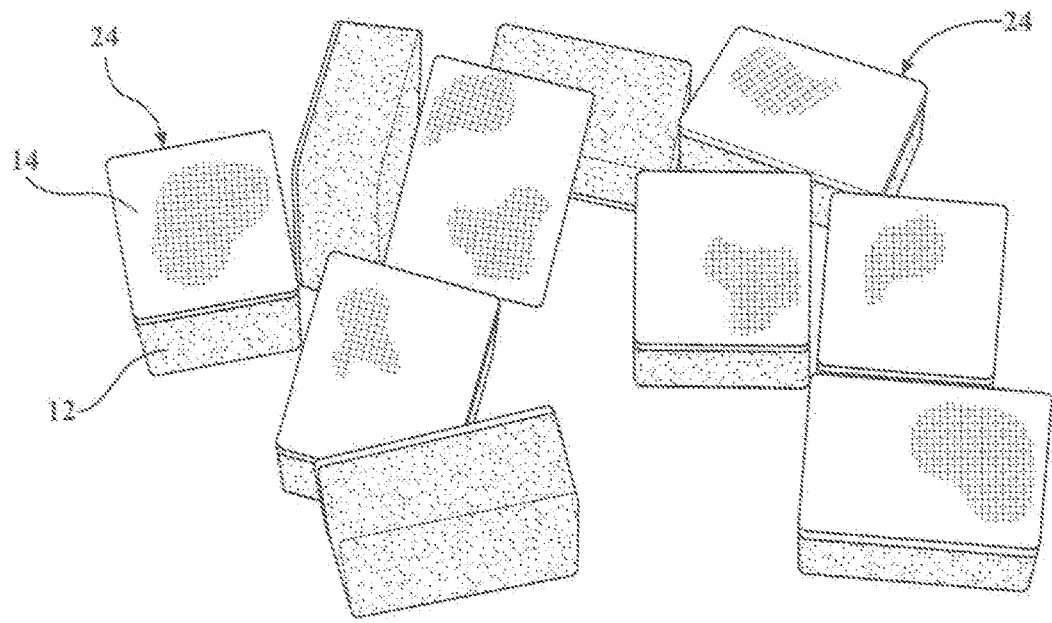
FIG. 4 is a perspective view of a plurality of trim padding blocks removed from the die cut openings formed in the trim padding of FIG. 3.

Referring to FIGS. 3-12, a thermally conductive padding 20 and method of assembling the thermally conductive padding 20 is shown according to one embodiment of the invention. Starting with reference to FIG. 3, a trim padding 10 is shown with a plurality of spaced apart die cut openings 22 formed therein. The openings 22 shown in FIG. 3 are generally square, however, it should be appreciated that the size and shape may varying without altering the scope of the invention. Additionally, the foam material 12 of the trim padding 10 may optionally include the top layer of trim material 14. The cutout portions from the die cut trim padding 10 are shown as a plurality of individual trim padding blocks 24 in FIG. 4.

Figure 5:
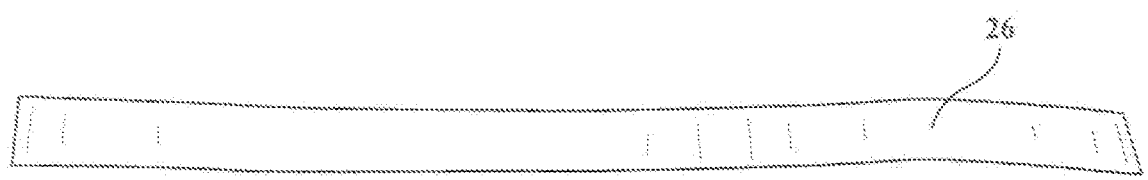
FIG. 5 is a plan view of a strip of graphite ribbon.
Figure 6:
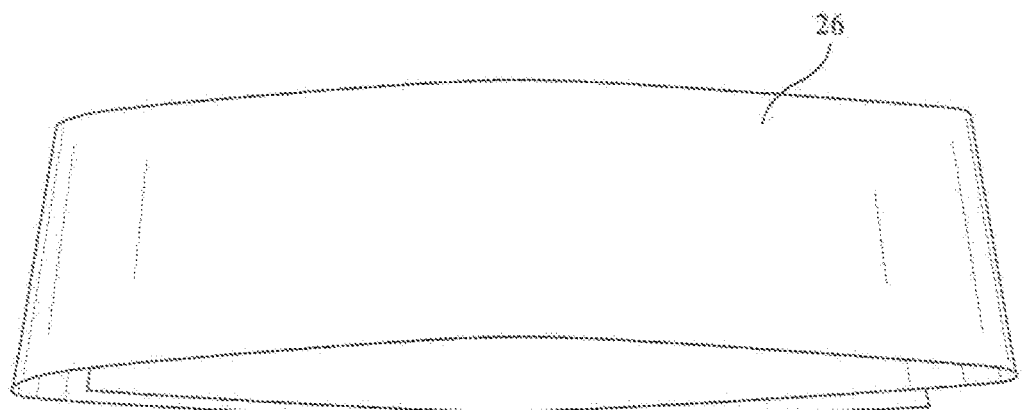
FIG. 6 is a perspective view of the strip of graphite ribbon of FIG. 5 folded into multiple layers.
Figure 7:
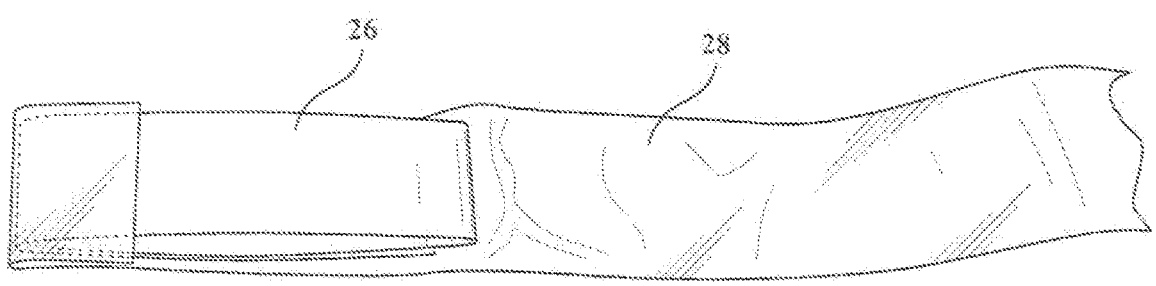
FIG. 7 is a perspective view of the folded graphite ribbon and a film carrier.
Figure 8:
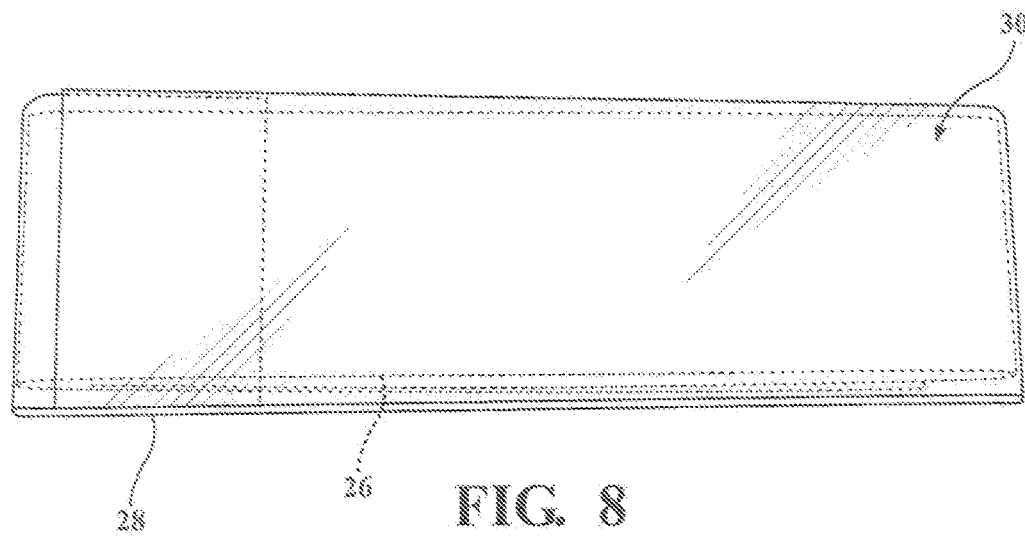
FIG. 8 is perspective view of the folded graphite ribbon encased in the film carrier forming a graphite ribbon assembly.

Referring to FIGS. 5 and 6, an elongated, strip of graphite ribbon is shown at 26. The ribbon 26 is preferably 0.25 mm thick by 20 mm wide, however, the dimensions may vary as desired. The ribbon 26 is comprised of a cotton, fiberglass or metal core with a coating of expanded graphite. The elongated strip of ribbon 26 is then folded one or more times to create multiple overlapping layers of the ribbon as shown in FIG. 6. Layers of the ribbon 26 may vary to achieve the quantity of heat transfer desired. That is, the more layers of ribbon 26, the greater the thermal conductivity. Referring to FIGS. 7 and 8, the graphite ribbon 26 is encased with a carrier 28 to electrically isolate and add strength to the ribbon 26. The carrier 28 may be a strip of Kapton, urethane, or polyester film material wrapped around and encasing the layers of ribbon 26, creating a graphite ribbon assembly 30 as shown in FIG. 8.

Figure 9:
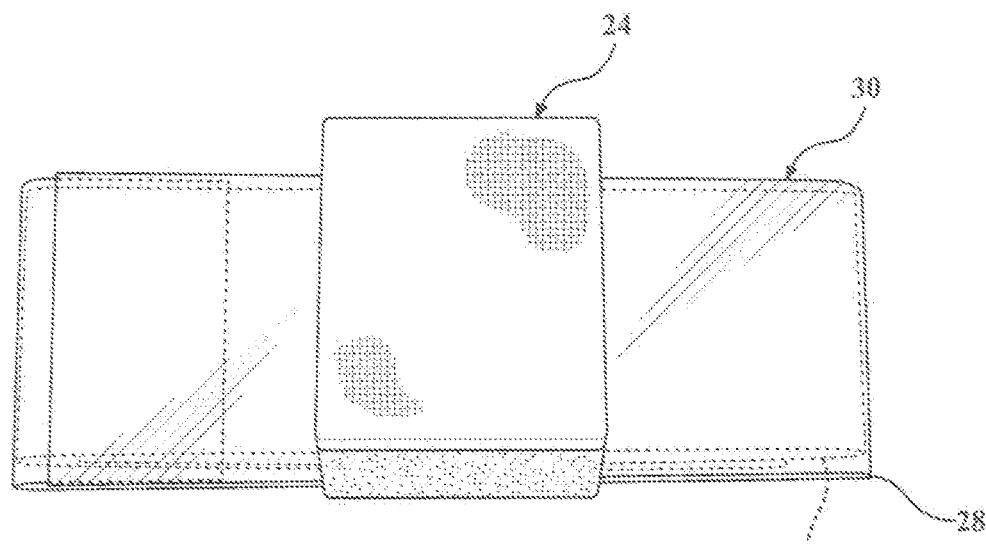
FIG. 9 is a perspective view of the trim padding block seated on the top of the graphite ribbon assembly.
Figure 10:
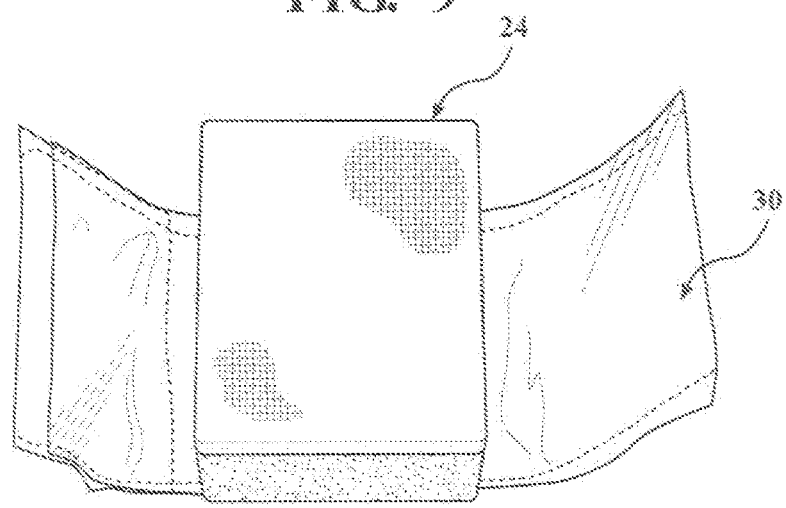
FIG. 10 is a perspective view of the graphite ribbon assembly rolling over the trim padding block.
Figure 11:
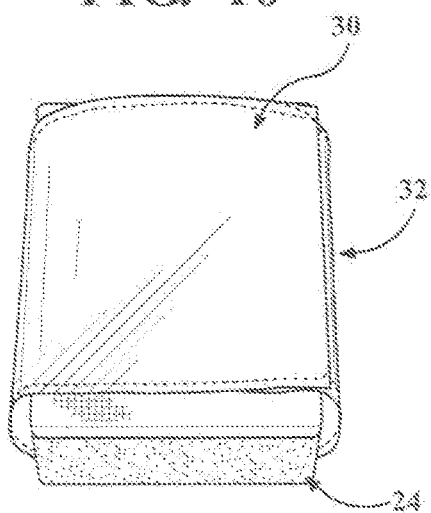
FIG. 11 is a perspective view of the graphite ribbon assembly encasing the trim padding block and creating a thermal tunneling pad.
Figure 12:
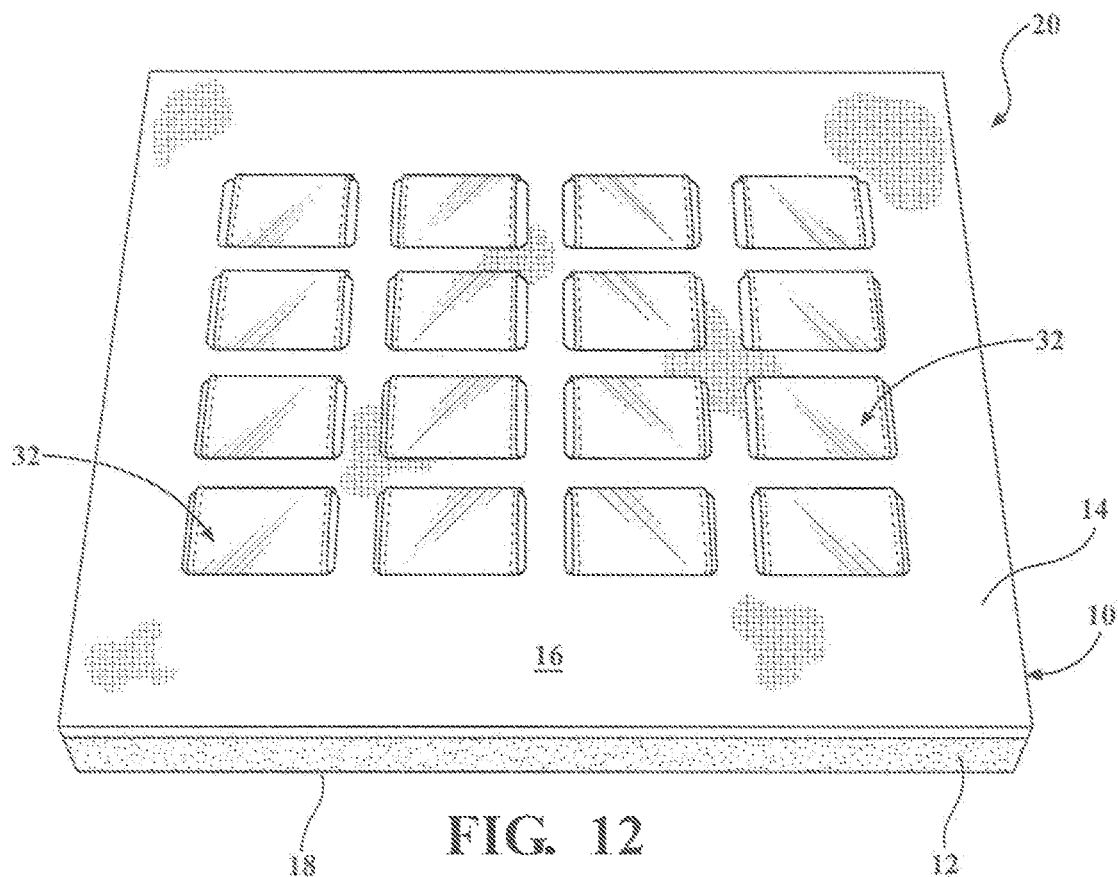
FIG. 12 is a perspective view of a plurality of thermal tunneling pads seated in the die cut openings of the trim padding forming a thermally conductive padding.

Referring now to FIGS. 9-11, the graphite ribbon assembly 30 is rolled or wrapped around the trim padding blocks 24 and bonded thereto by adhesive of any suitable type to form a thermal tunneling pad as shown at 32 in FIG. 11. The plurality of thermal tunneling pads 32 are then inserted back into the plurality of die cut openings 22 and bonded in the openings 22 by adhesive of any suitable type forming the fully assembled thermally conductive padding 20 with a plurality of spaced apart thermal tunneling pads 32 therein as shown in FIG. 12.

Figure 13:
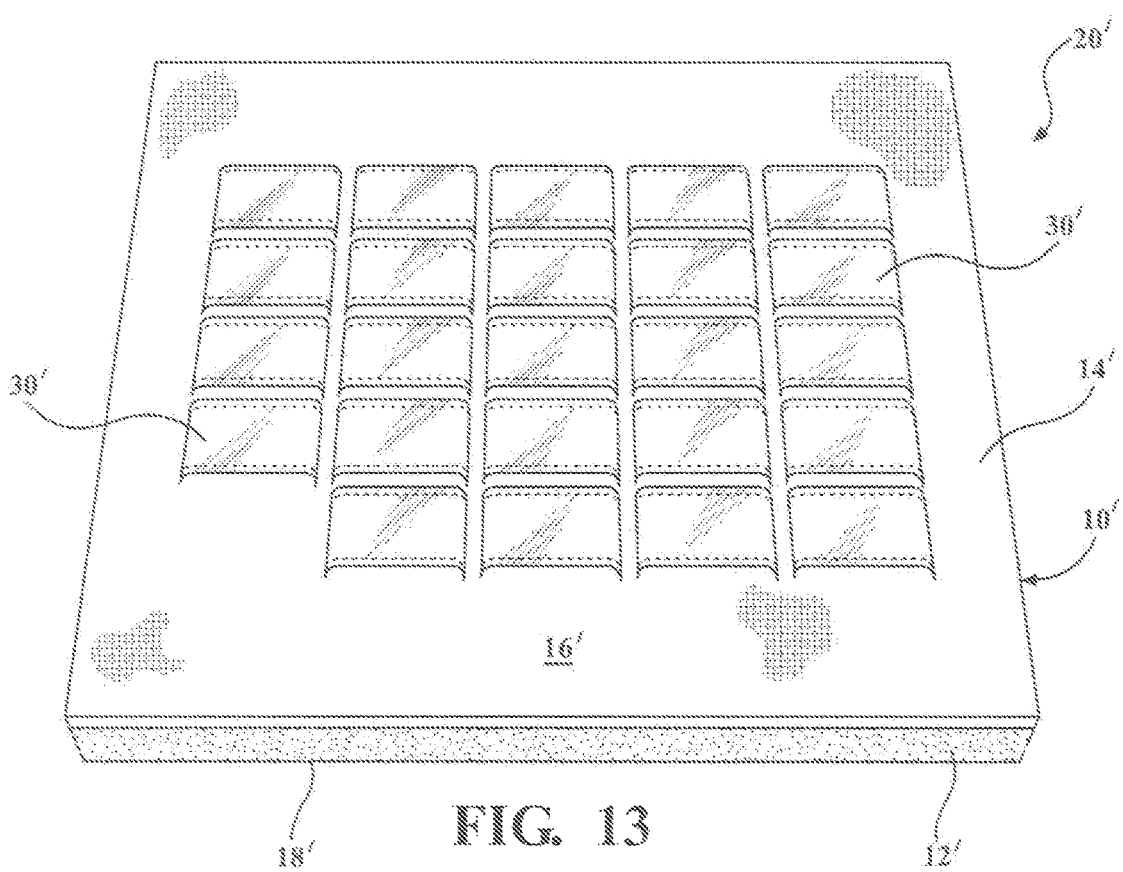
FIG. 13 is a top perspective view of a thermally conductive padding according to an alternative embodiment of the invention.
Figure 14:
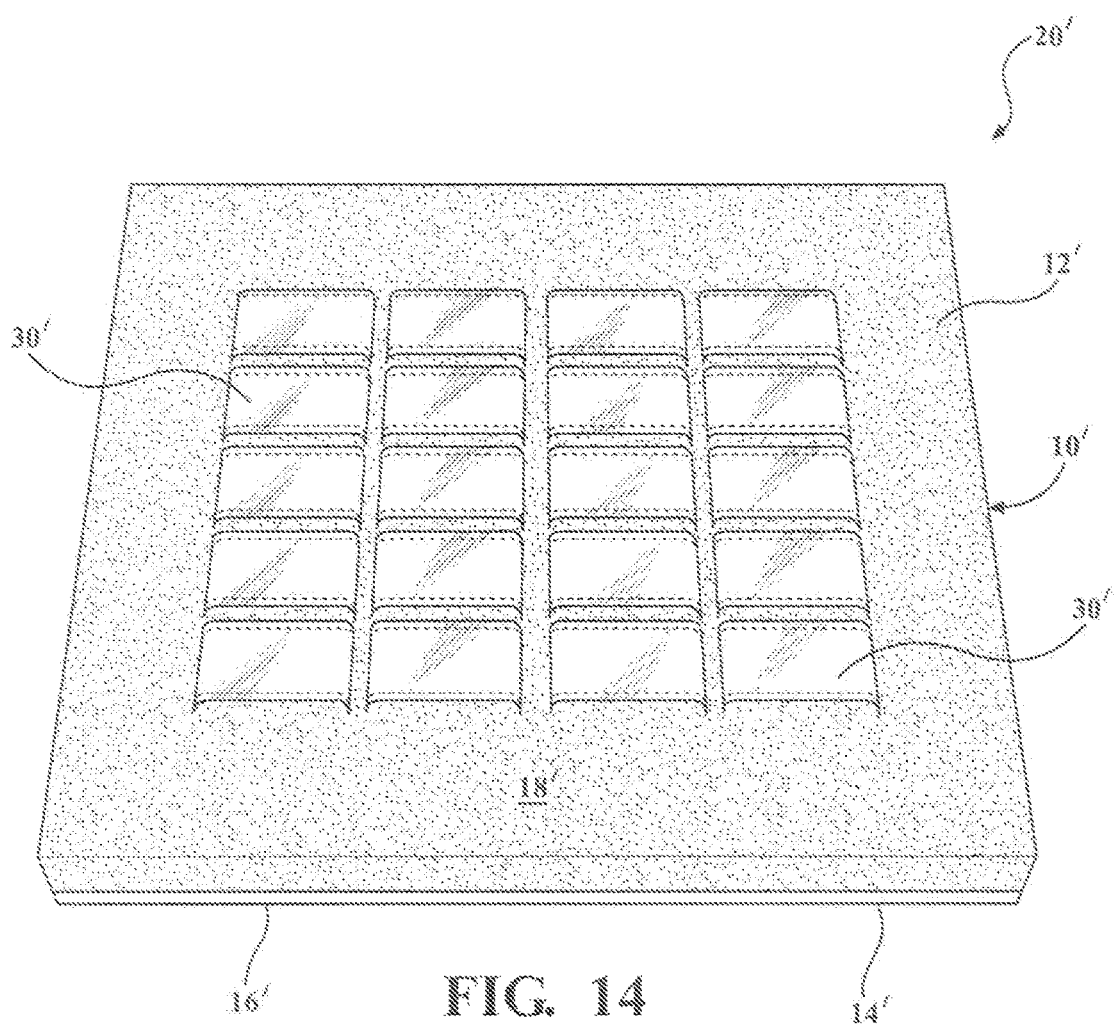
FIG. 14 is a bottom perspective view of the thermally conductive padding of FIG. 13.
Figure 15:
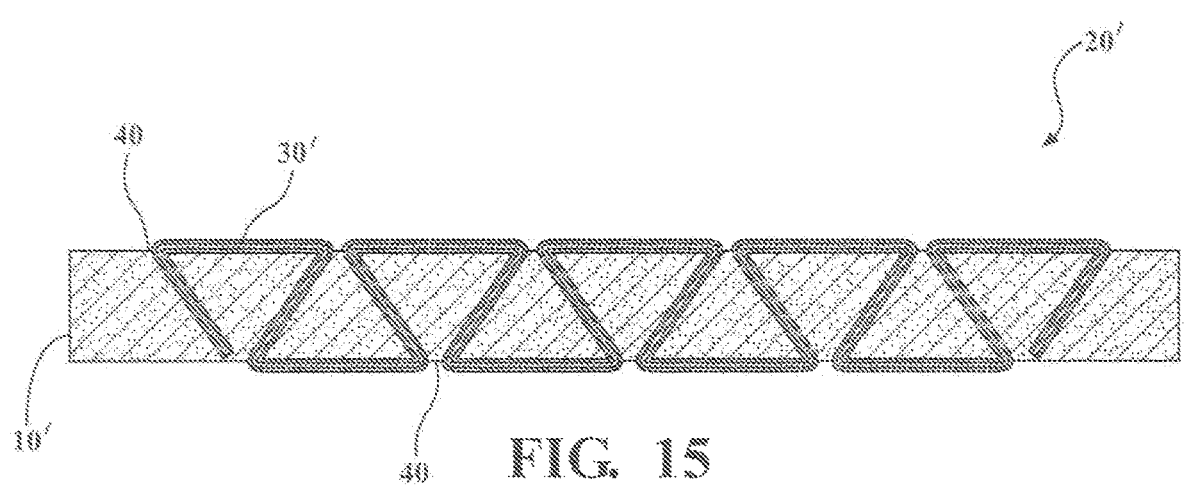
FIG. 15 is cross-sectional, view of the thermally conductive padding of FIG. 13.

Referring to FIGS. 13-15, a thermally conductive padding according to an alternative embodiment of the invention is shown at 20'. In the alternative embodiment, the graphite ribbon assembly 30' is woven through the trim padding 10' to enhance the thermal conductivity. More specifically, as shown in FIG. 15, elongated strips of the graphite ribbon assembly 30' are woven through a series or plurality of spaced apart open slots 40 formed through the trim padding 10' extending between the top surface 16' and the bottom surface 18'. The open slots 40 shown in FIG. 15 alternate at opposite angles to create a Z-pattern in the woven graphite ribbon assembly 30' to increase the surface area of the graphite ribbon assembly 30' in the padding 20'. Additional parallel rows of the woven graphite ribbon assembly 30' may extend through the trim padding 10' as shown and as desired. Additionally, the angle and resulting woven pattern of the graphite ribbon assembly 30' may vary as desired without varying the scope of the invention. Weaving the long graphite ribbon assembly 30' through the trim padding 10' enables the trim padding 10' to remain soft and pliable while enhancing its thermal conductivity and provides for a more efficient larger scale manufacturing process.

The thermal tunneling pads 32 or woven graphite ribbon assembly 30' substantially increases the thermal conductivity of the thermally conductive padding 10, 10' from 0.043 W/m-K to approximately 0.947 W/m-K and creates a large thermal surface area and thermal path to achieve maximum heat transfer through the padding 10, 10'. Further, the graphite ribbon assembly 30, 30' and thermal tunneling pads 32 remain flexible so that they cannot be felt by the user or provide a flat surface under a trim cover such that no visual read through can be detected in the surface.

The invention has been described in an illustrative manner, and it is to be understood that the terminology, which has been used, is intended to be in the nature of words of description rather than of limitation. Many modifications and variations of the present invention are possible in light of the above teachings. It is, therefore, to be understood that within the scope of the appended claims, the invention, may be practiced other than as specifically described.

What is claimed is:

1. A thermally conductive padding for transferring heat comprising:
   a layer of cellular foam padding having a plurality of spaced apart openings formed therein; and
   a thermal tunneling pad seated in each of said openings for creating a thermal path through said thermally conductive padding, said thermal tunneling pad comprising a cellular foam block encased in a strip of thermally conductive graphite ribbon.

2. The thermally conductive padding as set forth in claim 1 wherein said thermally conductive graphite ribbon comprises a core of non-conductive material coated with expanded graphite.

3. The thermally conductive padding as set forth in claim 2 wherein the core of non-conductive material coated with expanded graphite is encased within an electrically isolating carrier.

4. The thermally conductive padding as set forth in claim 3 wherein said graphite ribbon comprises layers of said non-conductive material coated with expanded graphite encased within said electrically isolating carrier.

5. The thermally conductive padding as set forth in claim 4 wherein said core of non-conductive material comprises cotton, fiberglass or metal.

6. The thermally conductive padding as set forth in claim 5 wherein said electrically isolating carrier comprises a film of Kapton, urethane or polyester.

7. A thermally conductive padding for transferring heat comprising:
- a layer of trim padding having a top surface and an opposite bottom surface, said trim padding comprising a cellular foam layer;
- a plurality of slots formed in said trim padding and extending between said top and bottom surfaces; and
- an elongated strip of thermally conductive graphite ribbon woven through said slots in said trim padding for creating a thermal path through said thermally conductive padding.

8. The thermally conductive padding as set forth in claim 7 wherein said thermally conductive graphite ribbon comprises a core of non-conductive material coated with expanded graphite.

9. The thermally conductive padding as set forth in claim 8 wherein the core of non-conductive material coated with expanded graphite is encased within an electrically isolating carrier.

10. The thermally conductive padding as set forth in claim 9 wherein said graphite ribbon comprises layers of said non-conductive material coated with expanded graphite encased within said electrically isolating carrier.

11. The thermally conductive padding as set forth in claim 10 wherein said core of non-conductive material comprises cotton, fiberglass or metal.

12. The thermally conductive padding as set forth in claim 11 wherein said electrically isolating carrier comprises a film of Kapton, urethane or polyester.

* * * * *